United States Patent [19]
Bajolet

[11] Patent Number: 5,861,126
[45] Date of Patent: Jan. 19, 1999

[54] SAFETY DEVICE FOR AN APPARATUS UNDER GAS OR VAPOR PRESSURE

[75] Inventor: Daniel Bajolet, Mulhouse, France

[73] Assignee: Industrie Chimique Mulhouse Dornach, Mulhouse, France

[21] Appl. No.: 727,663

[22] PCT Filed: Feb. 9, 1996

[86] PCT No.: PCT/FR96/00216

§ 371 Date: Jan. 6, 1997

§ 102(e) Date: Jan. 6, 1997

[87] PCT Pub. No.: WO96/25227

PCT Pub. Date: Aug. 22, 1996

[30] Foreign Application Priority Data

Feb. 17, 1995 [FR] France ................................. 95 01878

[51] Int. Cl.⁶ .............................. G05B 9/00; G05B 9/05
[52] U.S. Cl. ........................................ 422/117; 422/118
[58] Field of Search ................................. 422/117, 118

[56] References Cited

U.S. PATENT DOCUMENTS

| | | | |
|---|---|---|---|
| 4,255,387 | 3/1981 | Gardner | 422/113 |
| 4,339,412 | 7/1982 | Durand et al. | 422/117 |
| 4,476,097 | 10/1984 | Van Pool et al. | 422/112 |
| 4,520,953 | 6/1985 | Fallon | 222/398 |
| 4,566,476 | 1/1986 | Fallon et al. | 137/71 |
| 4,622,209 | 11/1986 | Nardi et al. | 422/112 |
| 4,627,962 | 12/1986 | Grasset et al. | 422/40 |

FOREIGN PATENT DOCUMENTS

| | | |
|---|---|---|
| 149086 | 10/1902 | Germany . |
| 254 835 A1 | 3/1988 | Germany . |
| 40 18 232 A1 | 12/1991 | Germany . |
| 2 246 576 | of 1902 | United Kingdom . |

OTHER PUBLICATIONS

Database WPI, Section Ch, Week 7508, Derwent Publications Ltd., London, GB; Class J09, AN 75–15543W & SU–A–423 995 (S.M. Beizerov et al.) 16 Sep. 1974.

M.A. Grolmes et al., "Large–Scale Experiments of Emergency Relief Systems," *Chemical Engineering Progress*, vol. 18, No. 8, Aug. 1985, New York, US, pp. 57–62.

*Primary Examiner*—Nina Bhat
*Attorney, Agent, or Firm*—Burns Doane Swecker & Mathis L.L.P.

[57] ABSTRACT

A safety device for gas or steam pressure vessel, including at least one downstream valve connected to the pressure vessel via a tubing with a burst disc dividing the tube into an upstream section A and a downstream section B. The downstream section B includes a protective assembly for minimizing the maximum pressure of a shock wave generated when the burst disc is broken and strikes the valve.

10 Claims, 4 Drawing Sheets

SAFETY DEVICE FOR AN APPARATUS UNDER GAS OR VAPOR PRESSURE

This is a national stage application of PCT/FR96/0216.

The present invention relates to a safety device for an apparatus under gas or vapour pressure, such as a reactor, comprising at least one downstream valve connected to the pressurized apparatus by a tube having a burst disc dividing this tube into an upstream segment and a downstream segment.

Regulations currently in force require that apparatuses under gas or vapour pressure be protected by one or more safety valves. When there is a risk of these valves being clogged by products resulting from normal operation of these apparatuses, it is common practice to place a burst disc upstream of these valves, this disc being intended to open before the pressure initiating opening of the valves is reached.

However, the industrial use of these devices with a safety valve sometimes leads to premature opening of a valve, which has the drawback of leading to accidental pollution of the surroundings of the site. This opening is all the more problematic since it results from accidental rupture of the burst disc, even though the pressure in the pressurized apparatus is very much less than the pressure initiating opening of the valve or valves. For example, it has already been observed that a burst disc calibrated at 48 bar, rupturing accidentally under a pressure of 41 bar, causes a safety valve calibrated at 50 bar to open.

The object of the invention is to provide a safety device which makes it possible to prevent premature opening of a safety valve in the event of accidental rupture of a burst disc when the pressure in the pressurized working apparatus protected by the valve is markedly less than the pressure initiating opening of this valve.

To this end, the subject of the invention is a safety device for an apparatus under gas or vapour pressure, comprising at least one downstream valve connected to the pressurized apparatus by a tube having a burst disc dividing this tube into an upstream segment and a downstream segment, characterized in that the downstream segment includes protection means which are designed to minimize the maximum pressure of a shock wave created by the rupture of the burst disc and striking the closure member of the said at least one valve.

The safety device of a pressurized apparatus according to the invention may include one or more of the following characteristics:

the protection means are formed by a gas of low molar mass and having high ratios γ of the heat capacities at constant pressure and at constant volume which is contained in the downstream segment B;

the protection means are formed by a chamber which contains a gas and is placed on the segment B and has a shape designed to reduce the shock wave formed by an incident shock wave and by a reflected shock wave, and acting on the closure member of the said at least one valve;

the protection means are formed by a gas of low molar mass and having high ratios γ of the heat capacities at constant pressure and at constant volume which is contained in a chamber arranged on the downstream segment B;

the gas is formed by one of the two gases nitrogen and helium;

in the case of a device with a plurality of valves, each valve is independently connected to the chamber;

the closure member of at least one valve is connected to at least one strainer projecting into the chamber; and the chamber is connected to means for keeping the said chamber under slight gas overpressure.

An example of the prior art and an illustrative embodiment of the device according to the invention will now be described with reference to the appended drawings, in which:

Figure 1:
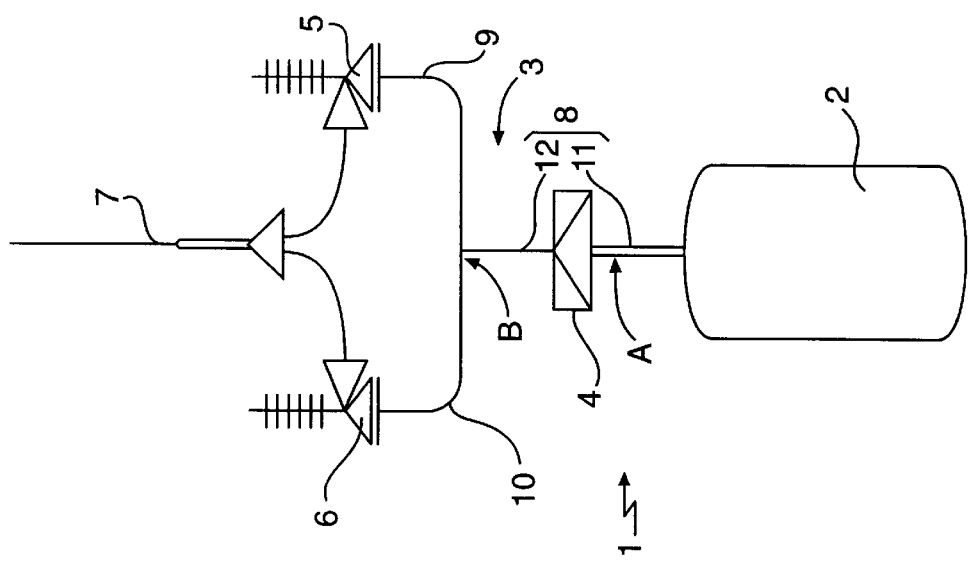
FIG. 1 is a diagram of a device according to the prior art.

The device represented in FIG. 1 is known and comprises an apparatus 2 under gas or vapour pressure, for example a reactor, a tube 3, a burst disc 4, two safety valves 5 and 6 and an outlet collection pipe 7.

The tube 3 connects the apparatus 2 to the two valves 5 and 6. It consists of a straight pipe 8, a first end of which is tapped upstream of the apparatus 2 and the second end of which splits into two horizontal branches 9, 10, each having a right-angled shape.

The free ends of the branches 9 and 10 respectively have the valves 5 and 6, thus located downstream of the apparatus 2.

The burst disc 4 is interposed between the apparatus 2 and the valves 5 and 6, while being placed along the length of the straight tube 8, which is thus divided into two parts 11 and 12. This disc 4 consequently divides the tube 3 into two segments: a segment A located upstream of the disc 4 and a segment B located downstream of this disc. The segment A thus consists of the part 11 of the pipe 8, while the segment B comprises the part 12 of this pipe as well as the branches 9 and 10.

The gas overhead in the apparatus 2 generally consists of a first gas with high speed $a_1$ ($a_1$ being the speed of sound in this medium), whose pressure is $P_1$, whose temperature is $T_1$ and whose ratio of the heat capacities at constant pressure and constant volume is $\gamma_1$. The segment A connected to the reactor 2 is also filled with this same gas.

A second gas, in general air or nitrogen, occupies the volume of the segment B. This gas has a speed $a_1$, a pressure $P_2$, a temperature $T_2$ and a ratio $\gamma_2$ of the heat capacities at constant pressure and at constant volume.

The burst disc 4 is intended to rupture at a given pressure $P_r$, and the valves 5, 6 are calibrated at the pressure $P_s$, with $P_s$ slightly greater than $P_r$.

When the disc 4 in this prior art device accidentally ruptures under pressure P which is markedly less than the pressure $P_r$, it is observed that the valves 5 and 6 open fully, in spite of the fact that the pressure P is very much less than the opening pressure $P_s$ of these valves 5 and 6.

Opening of the valves 5 and 6 may be highly problematic under these conditions, since it leads to pollution of the environment even though the apparatus 2 is operating normally, that is to say the pressure $P_1$ is not abnormally high.

By fitting pressure sensors at the closure members of each valve 5 and 6 in order to obtain the characteristics of the pressure (FIG. 2) $P_2$ in the downstream segment B, it was observed that rupture of the burst disc 4 leads to the formation of a shock wave or a shock-wave train.

Figure 2:
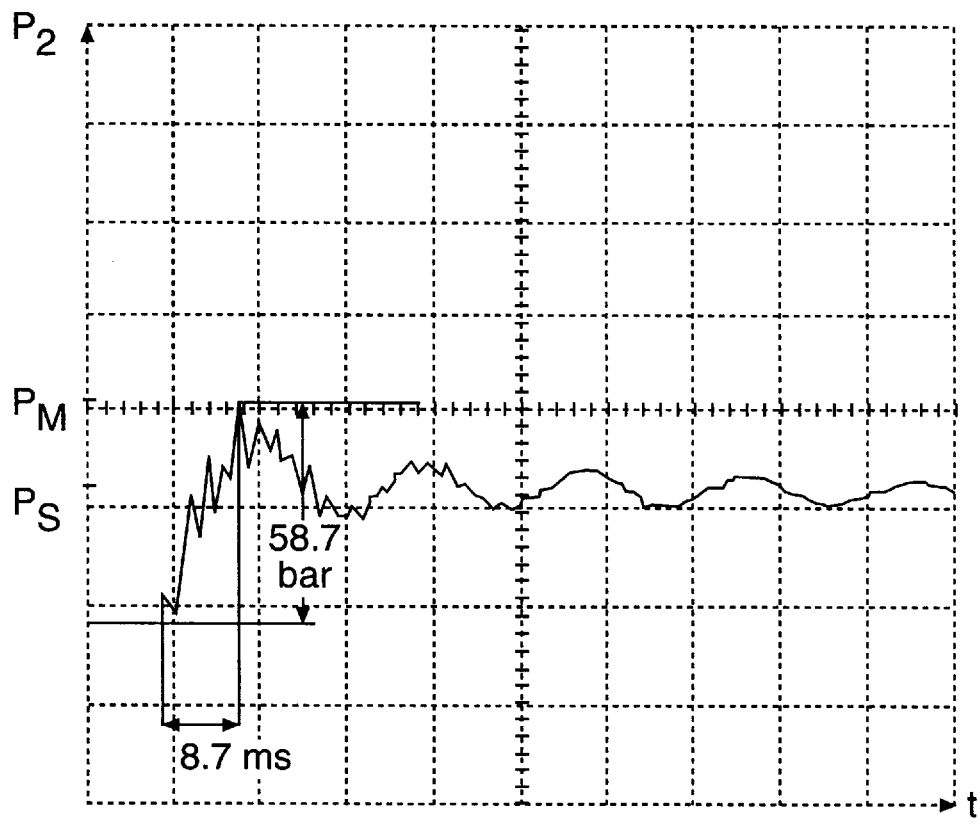
FIG. 2 is a graph of the characteristics of a shock wave created by the rupture of a burst disc of the device in FIG. 1.

The curve in FIG. 2, characteristic of the pressure generated by the shock wave as a function of time, shows that the pressure at the closure members of the valves passes through a maximum $P_M$. Since the value of this maximum is greater than the calibration pressure $P_s$ of the valves, the latter open fully.

In fact, the maximum pressure $P_M$ of the shock wave is the product of the pressure maximum $P_4$ of the incident shock wave, having a temperature $T_4$, and the pressure maximum $P_5$ of the reflected shock wave or of the train of reflected shock waves at the temperature $T_5$. The reflected wave in question is the resultant of the shock waves reflected under the seats of the valves, which combine to obtain a reflected shock wave having high energy and high temperature. In particular, in the device in FIG. 1, the reflected shock waves recombine at the point where the branches 9, 10 connect with the part 12 of the pipe 8.

These pressure maxima of the incident shock wave and of the reflected shock wave are calculated by the following approximate formulae:

$$\frac{P_4}{P_2} = \frac{2\gamma_2 M^2 - (\gamma_2 - 1)}{\gamma_2 + 1} \tag{1}$$

$$\frac{P_5}{P_4} = \frac{[(\gamma_2 + 1)/(\gamma_2 - 1)] + 2 - [(P_2/P_4)]}{1 + [(\gamma_2 + 1)/(\gamma_2 - 1)][(P_2/P_4)]} \tag{2}$$

$$\frac{T_4}{T_2} = \frac{[\gamma_2 M^2 - (\gamma_2 - 1)/2][(\gamma_2 - 1)/2)M^2 + 1]}{[(\gamma_2 + 1)/2]^2 M^2} \tag{3}$$

$$\frac{T_5}{T_4} = \frac{P_5}{P_4} \frac{[(\gamma_2 + 1)/(\gamma_2 - 1)](P_5/P_4)}{1 + [[(\gamma_2 + 1)/(\gamma_2 - 1)](P_5/P_4)]} \tag{4}$$

where M is the speed of the shock front at the interface of the two media and is obtained from the following formula:

$$\frac{P_1}{P_2} = \frac{2\gamma_2 M^2 - (\gamma_2 - 1)}{\gamma_2 + 1} \left[ 1 - \frac{\gamma - 1}{\gamma_2 + 1} \frac{a_2}{a_1} \left( M - \frac{1}{M} \right) \right]^{\left(-\frac{2\gamma_1}{\gamma_1 - 1}\right)} \tag{5}$$

with $$a_1 = \left( \gamma_1 \frac{R}{m_1} T_1 \right)^{0.5} \tag{6}$$

$$a_2 = \left( \gamma_2 \frac{R}{m_2} T_2 \right)^{0.5} \tag{7}$$

in which R is the ideal gas constant and $m_1$, $m_2$ the respective molar masses of the gases in the segments A and B.

These equations are obtained by considering that there is conservation of mass, momentum and energy on either side of the discontinuities represented by the incident and reflected shock waves, and by assuming that the gases follow the ideal gas law. The tube 3 is also considered to be straight.

Thus, the laws described above do not take into account the geometrical configuration of the connection piping between the disc 4 and the valves 5 and 6. In industrial configurations, the set-ups have configurations with changes in cross-section which lead to shock-wave values much higher than those calculated by the above formulae.

For example, it has been demonstrated on the device in FIG. 1 that the maximum pressure of the shock wave could reach a value about 58% greater than the initial rupture pressure $P_r$ of the disc 4, leading to the opening of valves calibrated at 50 bar effective in the case of disc rupture pressures of 40 bar effective.

The above formulae show that the strength of the shock wave is commensurately greater the higher the speed of sound in the gas located upstream (segment A) of the burst disc 4 and the lower the speed of sound in the gas located downstream (segment B) of the burst disc 4.

To this end, the device according to the invention includes protection means located in the downstream segment B, which are designed to minimize the maximum pressure of a shock wave created by the rupture of the burst disc and striking the closure members of the valves 5 and 6.

In a first embodiment of the invention, the structure of the device represented in FIG. 1 is retained while arranging, in the segment B located downstream of the burst disc 4, a gas whose ratio γ is high and whose molar mass m is low, which has the effect of substantially increasing the speed of sound $a_2$ in this gas.

Gases which satisfy the two criteria mentioned above are helium and hydrogen.

In a second embodiment of the invention, the protection means are formed by a chamber which is placed on the segment B and is intended to minimize the pressure maximum $P_M$ by avoiding the existence of incident shock waves and reflected shock waves striking the closure members of the valves 5 and 6.

A device having such means is described with reference to FIG. 3. In this device, the parts identical to those in FIG. 1 have the same numerical references.

Figure 3:
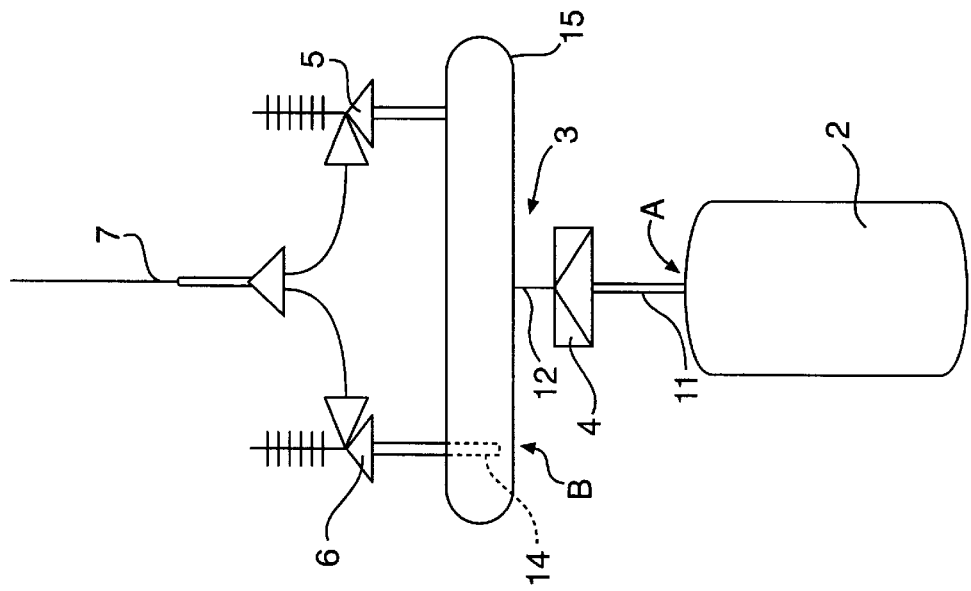
FIG. 3 is a diagram of a safety device according to the invention.

In this second embodiment of the invention, the safety device represented in FIG. 3 comprises the apparatus 2 to be protected, collected by the part 11 of the pipe 8 to the burst disc 4. A chamber 15 is connected downstream of the disc 4 by the part 12 of the pipe 8.

This chamber 15 is a cylinder, closed at its two ends by hemispherical or elliptical walls. It is placed perpendicularly to the straight pipe 12. The two safety valves 5 and 6 are now directly tapped over the length of the chamber 15, downstream thereof.

Figure 4:
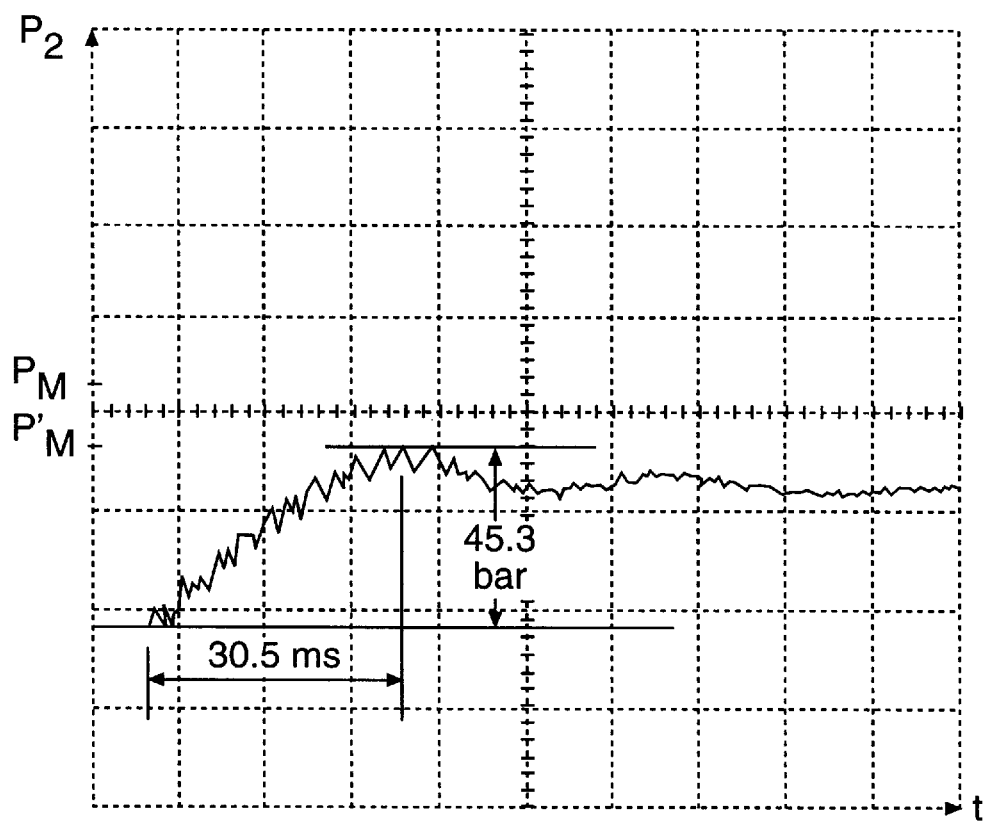
FIG. 4 is a graph giving the characteristics of a shock wave generated by the rupture of a burst disc of the device in FIG. 3.

The closure member of the safety valve 6 is connected to a straight strainer 14 projecting into the chamber 15. The cylindrical shape of the chamber 15 makes it possible to attenuate the incident waves and the reflected waves appearing when the burst disc 4 ruptures, which makes it possible to reduce the pressure maximum $P'_M$ (FIG. 4). This is because the waves reflected on the walls of the chamber return to the centre of the chamber 15 while being attenuated there, and the closure members of the valves 5 and 6 are not subjected to the pressure associated with these waves. It is observed that, in FIG. 4, the pressure maximum $P'_M$ is much less than the pressure maximum $P_M$ resulting from the prior art device. Furthermore, this maximum $P'_M$ is reached in a much longer time than before.

The strainer 14 allows a further improvement in the attenuation of the overpressure at the valve 6, by eliminating the incident waves and the reflected waves more effectively still.

Figure 5:
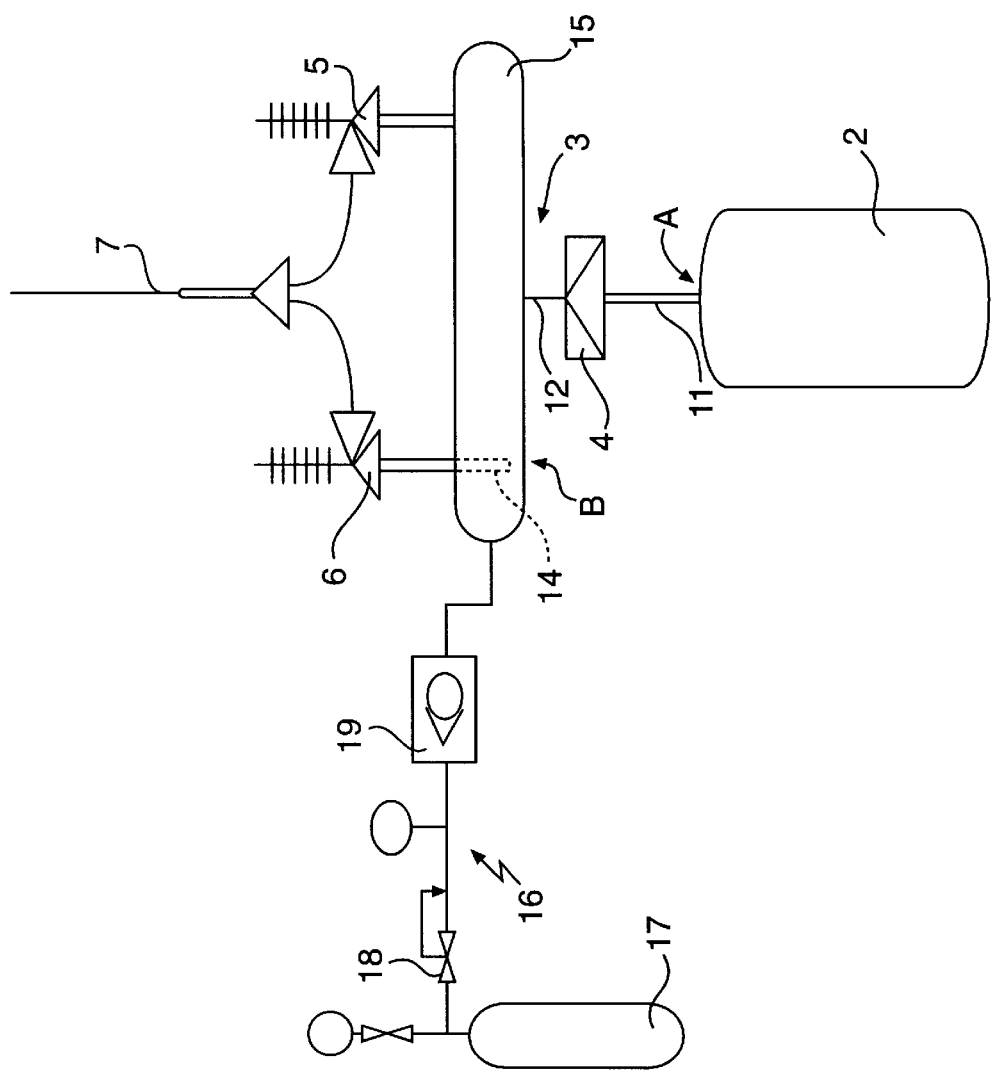
FIG. 5 is a diagram of another embodiment of the invention.

In a third embodiment of the invention, these protection means, consisting of the chamber 15, may be combined with the gas means such as helium or hydrogen. Thus, a gas such as helium or hydrogen can be kept under overpressure inside the chamber 15 by means 16 represented in FIG. 5.

The means 16 for keeping the chamber 15 under slight overpressure comprise a pressurized bottle 17, a pressure reduction stage 18 and a non-return valve 19. These means are connected to the chamber 15 at one of its hemispherical walls.

The compressed gas in the bottle 17 is expanded by the valve 18 and the non-return valve 19.

In this third embodiment of the invention, the overpressure at the closure member of the valve 5 with the unstrainered tube is then no more than 16% above the burst pressure, and only 7% at the closure member of the valve 6 with a strainered tube.

Furthermore, the use of valves without pilot control, capable of absorbing an overpressure, also makes it possible to avoid premature opening of these valves when the burst disc 4 ruptures.

I claim:

1. Safety device for an apparatus under gas or vapour pressure, said safety device comprising:

at least one downstream valve connected to the pressurized apparatus by a tube having a burst disc dividing said tube into an upstream segment A and a downstream segment B, wherein the downstream segment B includes protection means for minimizing the maximum pressure of a shock wave created by the rupture of the burst disc and striking a closure member of the said at least one valve.

2. Device according to claim 1, wherein said protection means includes a gas of low molar mass and having high ratios γ of the heat capacities at constant pressure and at constant volume being contained in the downstream segment B.

3. Device according to claim 2, wherein said gas is selected from the group consisting of nitrogen and helium.

4. Device according to claim 1, wherein said protection means includes a chamber which contains a gas and is placed on the segment B and has a shape designed to reduce the shock wave formed by an incident shock wave and by a reflected shock wave, and acting on the closure member of the said at least one valve.

5. Device according to claim 4, wherein said at least one valve includes a plurality of valves, each valve being independently connected to the chamber.

6. Device according to claim 5, wherein said closure member of at least one of said plurality of valves is connected to at least one strainer projecting into the chamber.

7. Device according to claim 4, wherein said chamber is connected to means for keeping the said chamber under slight gas overpressure.

8. Device according to claim 1, wherein said protection means includes a gas of low molar mass and having high ratios γ of the heat capacities at constant pressure and at constant volume being contained in a chamber arranged on the downstream segment B.

9. Device according to claim 8, wherein said gas is selected from the group consisting of nitrogen and helium.

10. In a safety device for an apparatus under gas or vapour pressure, said safety device including at least one downstream valve connected to the pressurized apparatus by a tube having a burst disc dividing said tube into an upstream segment A and a downstream segment B, said improvement comprising:

protection means disposed along said downstream segment B for minimizing the maximum pressure of a shock wave created by the rupture of the burst disc and striking a closure member of the said at least one valve.

* * * * *